US012699905B2

(12) United States Patent
Puzanov et al.

(10) Patent No.: US 12,699,905 B2
(45) Date of Patent: Aug. 4, 2026

(54) MONTE-CARLO ADVERSARIAL AUTOENCODER FOR MULTI-SOURCE DOMAIN ADAPTATION

(71) Applicant: International Business Machines Corporation, Armonk, NY (US)

(72) Inventors: Anton Puzanov, Mitzpe Ramon (IL);
Eitan Menahem, Beer Sheva (IL);
Andrey Finkelshtein, Beer Sheva (IL);
Noga Agmon, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 17/177,234

(22) Filed: Feb. 17, 2021

(65) Prior Publication Data

US 2022/0261657 A1     Aug. 18, 2022

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ............................... G06N 3/088; G06N 3/045
USPC ......................................................... 706/12
See application file for complete search history.

(56) References Cited

U.S. PATENT DOCUMENTS

| | | | | |
|---|---|---|---|---|
| 2012/0105234 A1* | 5/2012 | Oguri | ............... | G06F 18/24317 |
| | | | | 340/576 |
| 2018/0373979 A1* | 12/2018 | Wang | ............... | G06F 18/24143 |
| 2019/0324444 A1 | 10/2019 | Cella | | |
| 2020/0410403 A1* | 12/2020 | Kamulete | ............... | G06N 5/01 |
| 2021/0019629 A1* | 1/2021 | Chidlovskii | ......... | G06V 10/764 |
| 2021/0150281 A1* | 5/2021 | Tsai | ....................... | G06V 10/82 |

OTHER PUBLICATIONS

Hao He, Bayesian Modelling and Monte Carlo Inference for GAN, 2018, ICML, Theoretical Foundations and Applications of Deep Generative Models, Stockholm, Sweden. (Year: 2018).*

(Continued)

*Primary Examiner* — Matthew Ell
*Assistant Examiner* — Ishan Moundi
(74) *Attorney, Agent, or Firm* — Andre L. Adkins

(57)     ABSTRACT

Embodiments may include novel techniques for training and using an adversarial autoencoder for multi-source domain functions. For example, a method may comprise training an adversarial encoder comprising an encoder and a decoder by simultaneously training the encoder and the decoder, using data comprising a plurality of datasets, the data having labels based on an origin class and a dataset number, training the encoder to act as a generator to generate codewords based on the data for a generative adversarial network including the generator and a discriminator by training the generator to cause the discriminator to predict random labels for a plurality of data samples of each class and training the generator using the predicted random labels to generate codewords that relate to the origin class, and classifying new data samples using the trained adversarial encoder and generator, and the discriminator.

15 Claims, 3 Drawing Sheets

(56)              References Cited

OTHER PUBLICATIONS

Peng et al., Domain Agnostic Learning with Disentangled Representations, Proceedings of the 36 th International Conference on Machine Learning, Long Beach, California, PMLR 97, Apr. 2019.
V. K. Kurmi and V. P. Namboodiri, "Looking back at Labels: A Class based Domain Adaptation Technique," 2019 International Joint Conference on Neural Networks (IJCNN), Budapest, Hungary, 2019, pp. 1-8, doi: 10.1109/IJCNN.2019.8852199.
Zhao et al., Multiple Source Domain Adaptation with Adversarial Learning, arXiv:1705.09684v2 [cs.LG] Oct. 27, 2017.
A. Mendes, J. Togelius and L. d. S. Coelho, "Unified Multi-Domain Learning and Data Imputation using Adversarial Autoencoder," 2020 International Joint Conference on Neural Networks (IJCNN), Glasgow, UK, 2020, pp. 1-8, doi: 10.1109/IJCNN48605.2020. 9207024.

Glorot et al., "Domain adaptation for large-scale sentiment classi-fication: A deep learning approach", Proceedings of the 28th International Conference on Machine Learning, Jan. 2011, 8 pps.
Goodfellow et al., "Generative adversarial nets", In Advances in neural information processing systems, 2014, pp. 2672-2680.
Li et al., "Domain generalization with adversarial feature learning", 2018, In Proceedings of the IEEE Conference on Computer Vision and Pattern Recognition (pp. 5400-5409).
Makhzani et al., "Adversarial autoencoders", May 25, 2016, 16 pps., arXiv preprint arXiv:1511.05644.
Pei et al., "Multi-adversarial domain adaptation", Apr. 2018, 8 pps., In Thirty-Second AAAI Conference on Artificial Intelligence.
Sankaranarayanan et al., "Generate to adapt: Aligning domains using generative adversarial networks", 2018, In Proceedings of the IEEE Conference on Computer Vision and Pattern Recognition (pp. 8503-8512).
Tzeng et al., "Adversarial discriminative domain adaptation", 2017, In Proceedings of the IEEE Conference on Computer Vision and Pattern Recognition (pp. 7167-7176).

* cited by examiner

202
OBTAINING AND PROCESSING DATASET
$D_{ls} = X_0 \cup \ldots X_{K-1}$

204
TRAIN DISCRIMINATOR
USING $D_{ls}$

206
TRAIN AUTO-ENCODER
USING $D_{ls}$

208
TRAIN GENERATOR

210
CLASSIFY SAMPLES

212
ENCODE ALL SAMPLES WITH AAE

214
TRAIN CLASSIFIER

216
CLASSIFY NEW SAMPLES

200

MONTE-CARLO ADVERSARIAL AUTOENCODER FOR MULTI-SOURCE DOMAIN ADAPTATION

BACKGROUND

The present invention relates to the adaptation of multiple source domains using an adversarial auto encoder.

Many classification applications may be applied to previously unseen samples. This results in a cross domain problem, and often means worse accuracy compared to laboratory result. Prominent examples may include the cases of image classification, where physical aspects such as weather, distance, and lighting may affect the image capturing result, and cybersecurity where hackers constantly change their attacking techniques.

One technique that may be used to overcome this challenging issue is domain adaptation.

Domain adaptation considers samples from source domain $S$ and target domain $T$, and presents a set of techniques for unification of the different samples. When samples are labeled for both $S$ and $T$, the task would be called supervised domain adaptation.

When multiple (K) source datasets are available, $S = \{ S_1 \ldots S_K \}$, the problem may be called multi-source domain adaptation problem. Domain adaptation is often achieved by mapping sample to a different vector space. The constrained mapping may be achieved by using Adversarial Autoencoders. This type of encoder relies on Generative Adversarial Networks (GANs) (or multiple GANs) to enforce different constraints on the representation layer (also called codewords). GAN works in two phases. First, it is trained to validate whether a criterion is held or not, then it forces the network to comply to the criteria. This architecture has been used for domain adaptation before. After the encoder is ready, classifiers may be trained on the codeword representation of the samples, which presents a unified representation for all the sources.

Currently, there is no explicit handling of the classes of a target set. Rather, the general approach is that the classes of a target set would be mapped to similar codewords automatically. This presents two problems: the first is that source and target samples may result in disjoint codewords, the second is that this process doesn't consider the session's labels.

Accordingly, a need arises for improved techniques for training and using an adversarial autoencoder for multi-source domain datasets.

SUMMARY

Embodiments may include novel techniques for training and using an adversarial autoencoder for multi-source domain datasets. Embodiments of the present techniques may handle the classes included in the data from each source. For example, the techniques may be applied to the binary classification problem, but may be extended to any number of classes. Embodiments may provide a label aware Adversarial Auto-Encoder (supervised Auto-Encoder), which relies on GAN for domain adaptation and discrimination between the source labels. This ability is achieved by including a label discriminator component that is trained to group similar labels from different classes together. Adversarial Auto-Encoders (AAE) may be used to enforce characteristics of the codewords, and embodiments may use those methods to enforce codewords that encapsulate class aware patterns. This makes it possible to construct codewords that relate to origin classes. Embodiments may use a Monte-Carlo method to constantly change the prediction. Accordingly, the learning rate of the solvers may be periodically decreased in order to reach a steady solution, and/or other stabilization methods may be used.

For example, in an embodiment, a method may be implemented in a computer system comprising a processor, memory accessible by the processor, and computer program instructions stored in the memory and executable by the processor, the method may comprise training an adversarial encoder comprising an encoder and a decoder by simultaneously training the encoder and the decoder, using data comprising a plurality of datasets, the data having labels based on an origin class and a dataset number, training the encoder to act as a generator to generate codewords based on the data for a generative adversarial network including the generator and a discriminator by training the generator to cause the discriminator to predict random labels for a plurality of data samples of each class and training the generator using the predicted random labels to generate codewords that relate to the origin class, and classifying new data samples using the trained adversarial encoder and generator, and the discriminator.

In embodiments, the generated codewords may map items with a correct label from all sources. The discriminator may be a label/source discriminator that distinguishes between exact origin classes. The label/source discriminator may be used with the decoder to group similar data samples together and to make each label indistinguishable between the origin classes. New data samples may be classified by encoding the new data sample using the adversarial encoder to form a codeword, training a classifier using a set of all codewords and a set of all labels, and classifying the new data sample using the trained classifier and the formed codeword.

In an embodiment, a system may comprise a processor, memory accessible by the processor, and computer program instructions stored in the memory and executable by the processor to perform training an adversarial encoder comprising an encoder and a decoder by simultaneously training the encoder and the decoder, using data comprising a plurality of datasets, the data having labels based on an origin class and a dataset number, training the encoder to act as a generator to generate codewords based on the data for a generative adversarial network including the generator and a discriminator by training the generator to cause the discriminator to predict random labels for a plurality of data samples of each class and training the generator using the predicted random labels to generate codewords that relate to the origin class, and classifying new data samples using the trained adversarial encoder and generator, and the discriminator.

In an embodiment, a computer program product may comprise a non-transitory computer readable storage having program instructions embodied therewith, the program instructions executable by a computer, to cause the computer to perform a method that may comprise training an adversarial encoder comprising an encoder and a decoder by simultaneously training the encoder and the decoder, using data comprising a plurality of datasets, the data having labels based on an origin class and a dataset number, training the encoder to act as a generator to generate codewords based on the data for a generative adversarial network including the generator and a discriminator by training the generator to cause the discriminator to predict random labels for a plurality of data samples of each class and training the generator using the predicted random labels to generate codewords that relate to the origin class, and classifying new data samples using the trained adversarial encoder and generator, and the discriminator.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may include novel techniques for training and using an adversarial autoencoder for multi-source domain functions. Embodiments of the present techniques may handle the classes included in the data from each source. For example, the techniques may be applied to the binary classification problem, but may be extended to any number of classes. Embodiments may provide a label aware Adversarial Auto-Encoder (supervised Auto-Encoder), which relies on GAN for domain adaptation and discrimination between the source labels. This ability is achieved by including a label discriminator component that is trained to group similar labels from different classes together. Adversarial Auto-Encoders (AAE) may be used to enforce characteristics of the codewords, and embodiments may use those methods to enforce codewords that encapsulate class aware patterns. This makes it possible to construct codewords that relate to origin classes. Embodiments may use a Monte-Carlo method to constantly change the prediction. Accordingly, the learning rate of the solvers may be periodically decreased in order to reach a steady solution, and/or other stabilization methods may be used.

Figure 1:
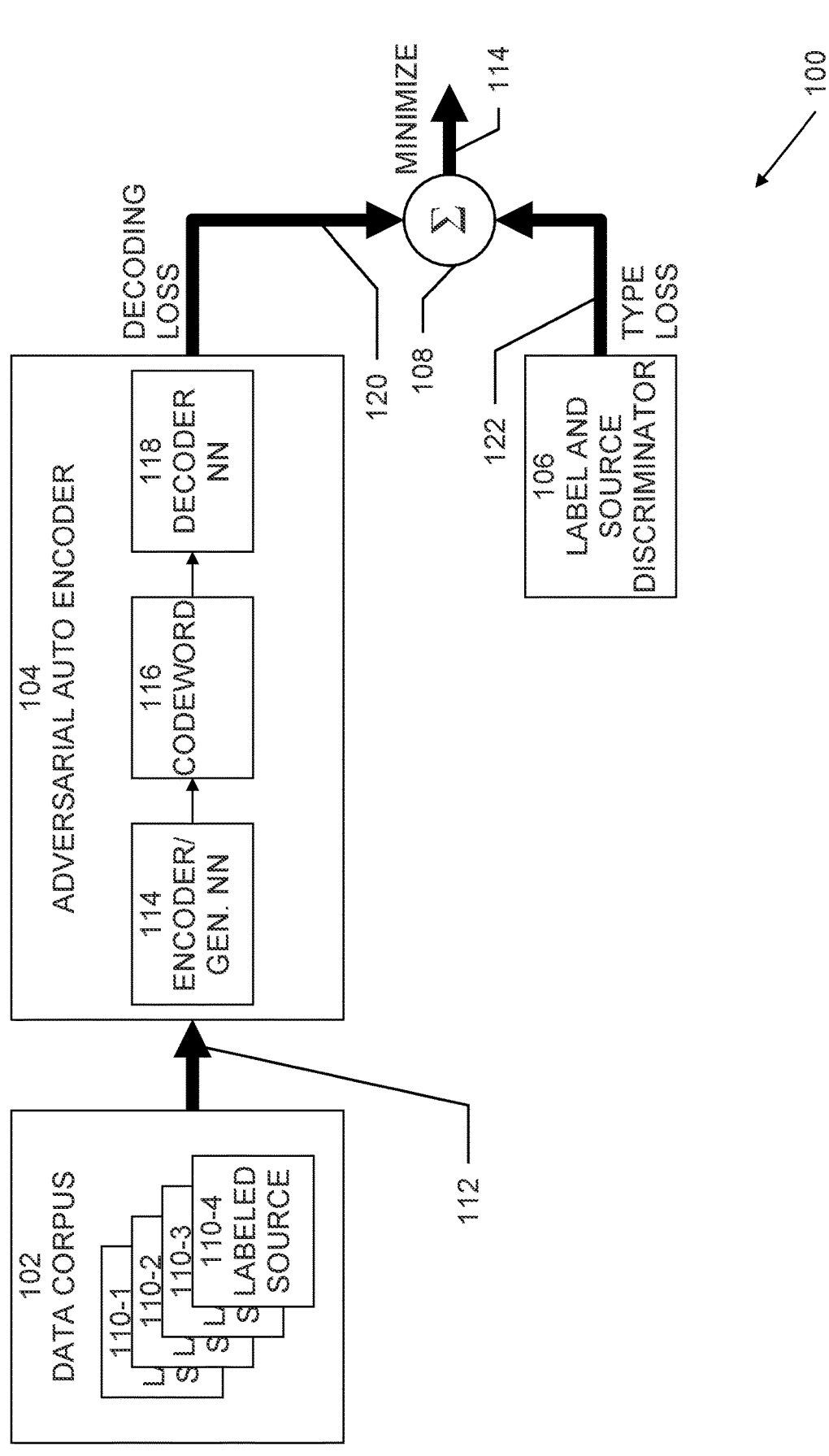
FIG. 1 illustrates an exemplary block diagram of a Framework Architecture according to embodiments of the present techniques.

For example, a block diagram of a Framework Architecture 100 is shown in FIG. 1. As shown in this example, components may include a data corpus 102, an Adversarial Auto Encoder 104, a label and source discriminator 106, and a summing element 108. Data corpus 102 may include a plurality of labeled sources of data, such as labeled sources 110-1-110-4 and may provide training samples 112 from labeled sources 110-110-4. Framework Architecture 100 may include, for example, three neural networks (NN). For example, Adversarial auto encoder 104 may include an Encoder/Generator (G) NN 114 to generate an encoded codeword 116, and may include a Decoder (P) NN 118 to decode encoded codeword 116 and to determine decoding loss 120. Further, Framework Architecture 100 may include Label/Source Discriminator 106, which may include a NN to generate a type loss 122. It is to be noted that the particular architectures of these NNs may be determined based on the complexity and nature of the samples. It is well within the ability of one or ordinary skill in the art to select NN architectures using well-known NN structures.

The output layers may include: for Encoder/Generator (G) NN 114, the input size may be the size of the raw data, and the output may be the codeword size (N), where N is a hyperparameter for the system. For Decoder (P) NN 118, the input size may be N, and the output may be the size of the raw data. For Label/Source Discriminator 106, the input size may be N, and the output size may be 2K.

Figure 2:
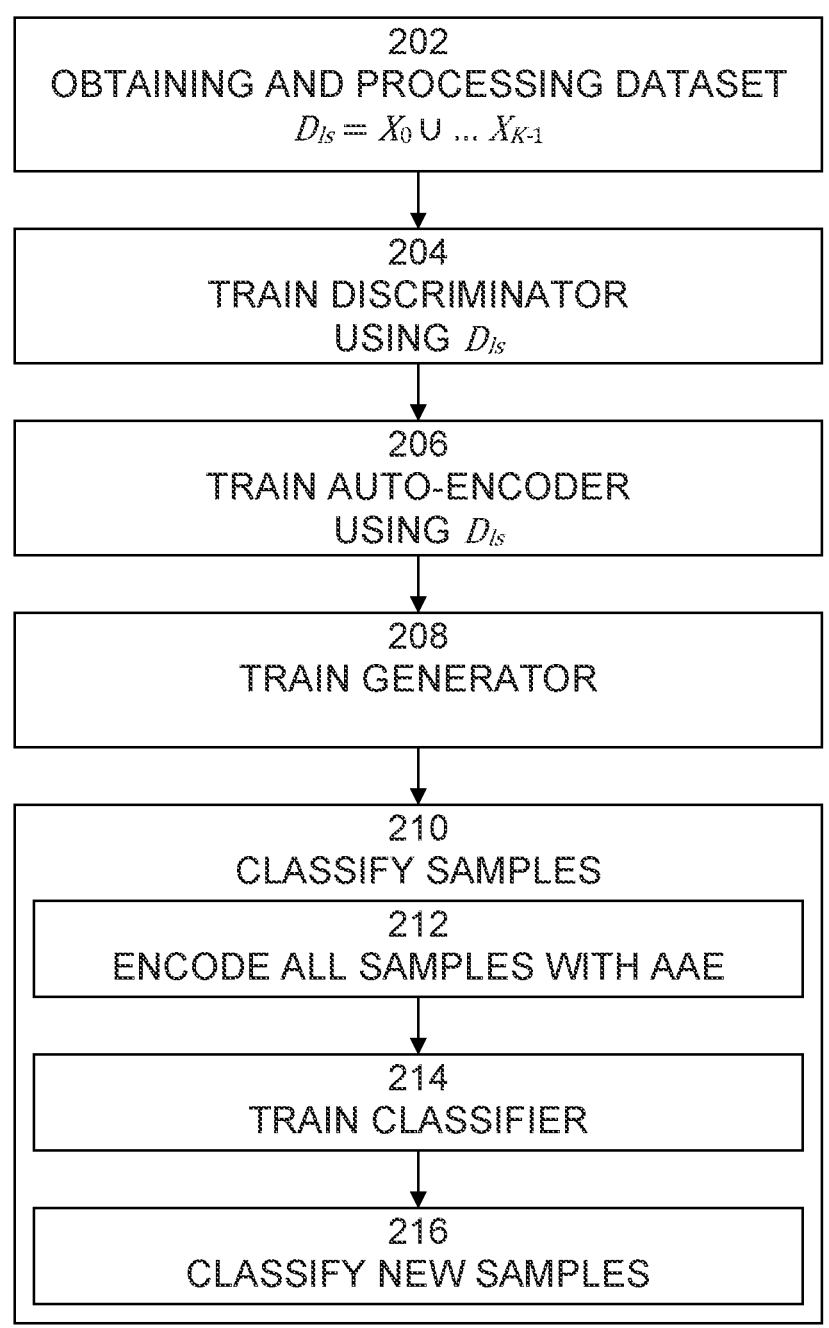
FIG. 2 is an exemplary flow diagram of processing according to embodiments of the present techniques.

An exemplary flow diagram of a process 200 involving the present techniques is shown in FIG. 2. For example, Framework Architecture 100 may learn a common representation for multiple source datasets, which is termed a "codeword" $r_i \in R$, 116 in FIG. 1. The codewords may be used to train a classifier. More formally, for a given dataset X with labels Y, all samples in X may be encoded so that R=G(X), and a classifier C may be trained using R, Y.

Process 200 begins with 202, in which one or more datasets may be obtained and processed. For example, for K labeled source datasets $\{X_0 \ldots X_{K-1}\}$, where each sample $x_i \in X_k$ corresponds to a binary label $\{y|x_i\} \in \{0,1\}$, a dataset may be created using the following scheme: $D_{ls}=X_0 \cup \ldots X_{K-1}$. This dataset consists of all source samples. It is labeled, and the label depends on the origin class and dataset number. The label may be defined using $(y|x_i, y_i \in X_k)$ $=y_i*K+k$, $k \in \{0 \ldots K-1\}$.

At 204, Label/Source Discriminator 106 may be trained, for example, using $D_{ls}$, as discriminator and training this discriminator to maximize the probability of assigning the correct label to all data source aware classes $\{0 \ldots 2K-1\}$. As the discriminator may be implemented using NNs, a derivative based optimization method may be used.

At 206, 208, Encoder/Generator (G) NN 114 may be trained. As shown, at 206, the auto-encoder (AE) function of Encoder/Generator (G) NN 114 may be trained. For example, dataset $D_{ls}$ may be used to train the AE. The AE may include an encoder and a decoder that are trained simultaneously, where the encoder acts also as the generator for the GAN architecture. The AE functions to map samples to codewords $r \in R$, while minimizing the difference between the input samples x and output sample approximation x'=P (G(x)). The similarity is usually measured by a distance function between the two vectors, such as MSE(x, x'). Note that this part may be unlabeled.

At 208, one or more generators for different classes may be trained. In order to improve the generalization of codewords, it is desired that each codeword represents a behavior pattern rather than encodes a specific sample. For this reason, a Monte-Carlo approach may be used for "fooling" the discriminator into predicting random source with the correct class. For example, for a sample x, whose original label is (y|x)=0, this generator may be trained to "fool" the discriminator into predicting a random label in $\{0 \ldots K-1\}$. This would encourage codewords which map items with the correct label from all sources. In other words, since the labels of the source domain are random, the codeword will be optimized when its ability to determine the source of the samples is as good as a random guess. As Encoder/Generator (G) NN 114 may be implemented using NNs, a derivative based optimization method may be used.

To provide a class aware generalization, Label/Source Discriminator 106 may distinguish between the exact classes in $S$. For example, for binary labels: $\{0,1\}$, and K=4 different source datasets, experiment labels may be marked as $l=\{0, \ldots 2K-1\}$, where the first K labels represent the original $\{0\}$ class from each dataset, and the next K labels represent classes $\{1\}$. Distinguishing between the exact classes in every source dataset allows the training of a generator that abstracts those relations, for example, using a Monte-Carlo approach for the Generator, with target labels are random experiment labels of the correct type. For example, for $x_i \in S_1$, $l_{x_i}=0$, the generator may be trained with a random label from $\{l_0 \ldots l_{K-1}\}$.

Using the discriminators together with a decoder make it possible to simultaneously optimize two requirements. First, the codeword is decoded back to a similar sample which implies meaningful abstraction, as similar samples are grouped together. Second, the label discriminator is used to make every label indistinguishable between the classes, which implies general codewords which could be applied to all sources.

At 210, trained Framework Architecture 100 may be used to classify samples. As described above, Framework Architecture 100 may learn a common representation for multiple source datasets, which is termed a "codeword" $r_i \in R$, 116 in FIG. 1. The codewords may be used to train a classifier. More formally, for a given dataset X with labels Y, all samples in X may be encoded so that R=G(X), and a classifier C may be trained using R, Y.

To classify a new sample $x_{new}$, at 212, sample $x_{new}$ may first be encoded by Adversarial Auto-Encoder 104 using G. At 214, a classifier C may be trained using R, Y. Then at 216, sample $x_{new}$ may be classified using C. y'=C(G($x_{new}$)).

Figure 3:
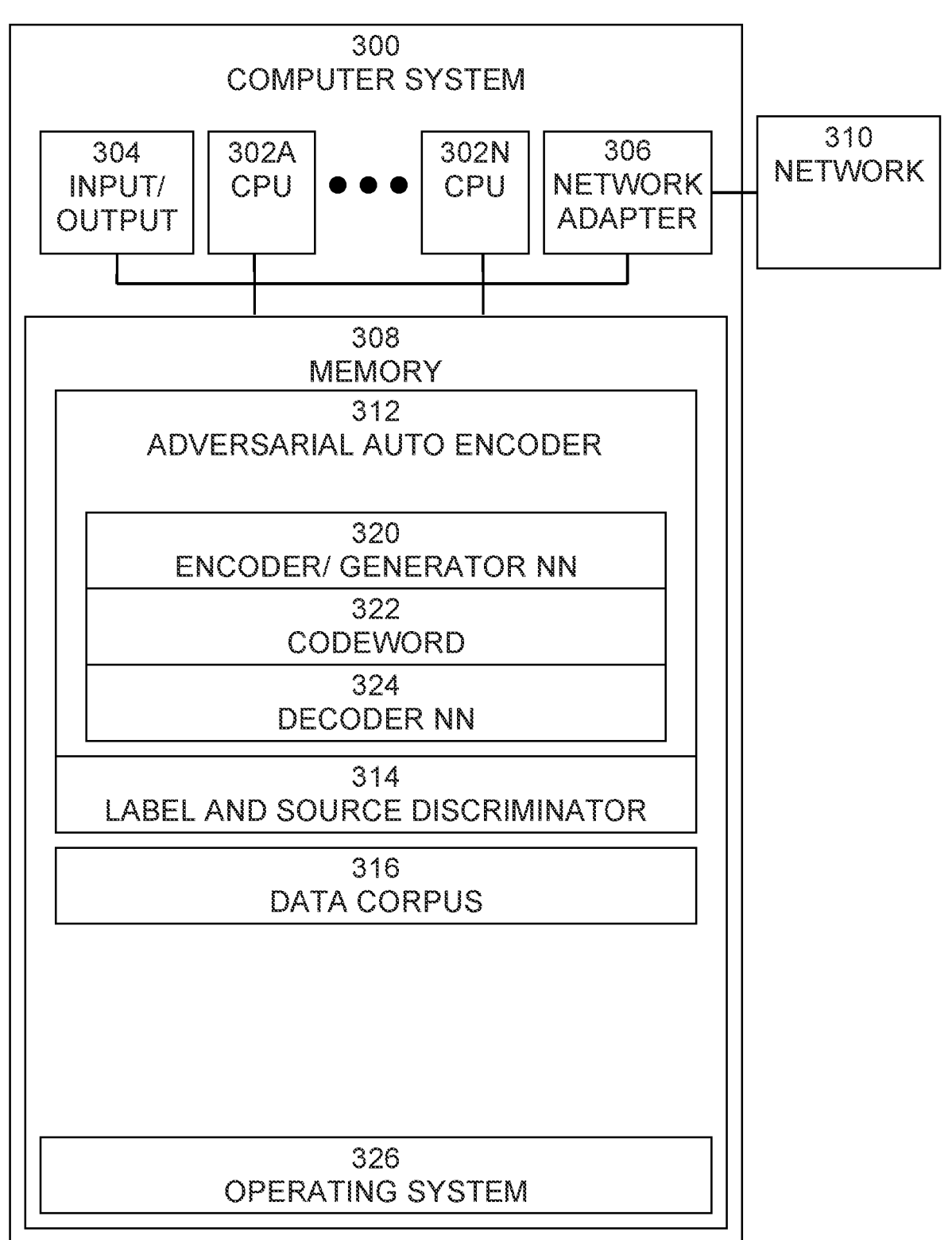
FIG. 3 is an exemplary block diagram of a computer system, in which processes involved in the embodiments described herein may be implemented.

An exemplary block diagram of a computer system 300, in which processes and components involved in the embodiments described herein may be implemented, is shown in FIG. 3. Computer system 300 may be implemented using one or more programmed general-purpose computer systems, such as embedded processors, systems on a chip, personal computers, workstations, server systems, and mini-computers or mainframe computers, or in distributed, networked computing environments. Computer system 300 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present communications systems and methods also include embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 3, memory 308 may include Adversarial Auto Encoder 312, Label and Source discriminator 314, and data corpus 316. Adversarial Auto Encoder 312 may include an Encoder/Generator (G) NN 320 to generate an encoded codeword 322, and may include a Decoder (P) NN 324 to decode encoded codeword 116 and to determine decoding loss 120. Label/Source Discriminator 314, which may include a NN to generate a type loss 122. Data corpus 316 may include a plurality of labeled sources of data and may provide training samples from such labeled sources. Operating system 330 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, memory accessible by the processor, and computer program instructions stored in the memory and executable by the processor, the method comprising:

training an adversarial encoder comprising an encoder and a decoder by simultaneously training the encoder and the decoder, using data comprising a plurality of datasets, the data having labels based on an origin class and a dataset number;

training the encoder to act as a generator to generate codewords based on the data for a generative adversarial network including the generator and a discriminator by training the generator to cause the discriminator to predict random labels for a plurality of data samples of each class and training the generator using the predicted random labels to generate codewords that relate to the origin class;

wherein the random labels are constantly changed utilizing a Monte-Carlo method and mapped based on the codewords; and classifying new data samples using the trained adversarial encoder and generator, and the discriminator by utilizing a Generative Adversarial Networks (GAN) for domain adaptation and discrimination between a plurality of source labels to enforce a plurality of constraints on the codewords;

wherein each codeword represents a behavior pattern that is class aware and distinguishes between the plurality of source labels.

2. The method of claim 1, wherein the generated codewords map items with a correct label from all sources utilizing the adversarial encoder comprising Generative Adversarial Networks (GANs).

3. The method of claim 1, wherein the discriminator is a label/source discriminator that distinguishes between exact origin classes.

4. The method of claim 3, wherein the label/source discriminator is used with the decoder to group similar data samples together and to make each label indistinguishable between the origin classes.

5. The method of claim 1, wherein new data samples are classified by:

encoding the new data sample using the adversarial encoder to form a codeword;

training a classifier using a set of all codewords and a set of all labels; and classifying the new data sample using the trained classifier and the formed codeword.

6. A system comprising a processor, memory accessible by the processor, and computer program instructions stored in the memory and executable by the processor to perform:

training an adversarial encoder comprising an encoder and a decoder by simultaneously training the encoder and the decoder, using data comprising a plurality of datasets, the data having labels based on an origin class and a dataset number;

training the encoder to act as a generator to generate codewords based on the data for a generative adversarial network including the generator and a discriminator by training the generator to cause the discriminator to predict random labels for a plurality of data samples of each class and training the generator using the predicted random labels to generate codewords that relate to the origin class;

wherein the random labels are constantly changed utilizing a Monte-Carlo method and mapped based on the codewords; and classifying new data samples using the trained adversarial encoder and generator, and the discriminator by utilizing a Generative Adversarial Networks (GAN) for domain adaptation and discrimination between a plurality of source labels to enforce a plurality of constraints on the codewords;

wherein each codeword represents a behavior pattern that is class aware and distinguishes between the plurality of source labels.

7. The system of claim 6, wherein the generated codewords map items with a correct label from all sources utilizing the adversarial encoder comprising Generative Adversarial Networks (GANs).

8. The system of claim 6, wherein the discriminator is a label/source discriminator that distinguishes between exact origin classes.

9. The system of claim 8, wherein the label/source discriminator is used with the decoder to group similar data samples together and to make each label indistinguishable between the origin classes.

10. The system of claim 6, wherein new data samples are classified by:

encoding the new data sample using the adversarial encoder to form a codeword;

training a classifier using a set of all codewords and a set of all labels; and classifying the new data sample using the trained classifier and the formed codeword.

11. A computer program product comprising a non-transitory computer readable storage having program instructions embodied therewith, the program instructions executable by a computer, to cause the computer to perform a method comprising:

training an adversarial encoder comprising an encoder and a decoder by simultaneously training the encoder and the decoder, using data comprising a plurality of datasets, the data having labels based on an origin class and a dataset number;

training the encoder to act as a generator to generate codewords based on the data for a generative adversarial network including the generator and a discriminator by training the generator to cause the discriminator to predict random labels for a plurality of data samples of each class and training the generator using the predicted random labels to generate codewords that relate to the origin class;

wherein the random labels are constantly changed utilizing a Monte-Carlo method and mapped based on the codewords; and classifying new data samples using the trained adversarial encoder and generator, and the discriminator by utilizing a Generative Adversarial Networks (GAN) for domain adaptation and discrimination between a plurality of source labels to enforce a plurality of constraints the codewords;

wherein each codeword represents a behavior pattern that is class aware and distinguishes between the plurality of source labels.

12. The computer program product of claim 11, wherein the generated codewords map items with a correct label from all sources utilizing the adversarial encoder comprising Generative Adversarial Networks (GANs).

13. The computer program product of claim 11, wherein the discriminator is a label/source discriminator that distinguishes between exact origin classes.

14. The computer program product of claim 13, wherein the label/source discriminator is used with the decoder to group similar data samples together and to make each label indistinguishable between the origin classes.

15. The computer program product of claim 11, wherein new data samples are classified by:

encoding the new data sample using the adversarial encoder to form a codeword;

training a classifier using a set of all codewords and a set of all labels; and classifying the new data sample using the trained classifier and the formed codeword.

* * * * *